(12) United States Patent
Han et al.

(10) Patent No.: US 9,148,688 B2
(45) Date of Patent: Sep. 29, 2015

(54) ELECTRONIC APPARATUS AND METHOD OF CONTROLLING ELECTRONIC APPARATUS

(71) Applicant: SAMSUNG ELECTRONICS CO., LTD., Suwon-si, Gyeonggi-do (KR)

(72) Inventors: Sang-jin Han, Gunpo-si (KR); Yong-hwan Kwon, Seongnam-si (KR); Jung-geun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/247,328

(22) Filed: Apr. 8, 2014

(65) Prior Publication Data

US 2014/0223477 A1    Aug. 7, 2014

Related U.S. Application Data

(63) Continuation of application No. 14/152,011, filed on Jan. 10, 2014, which is a continuation of application No. 13/648,314, filed on Oct. 10, 2012, now Pat. No. 8,650,036.

(30) Foreign Application Priority Data

Dec. 30, 2011 (KR) .......................... 10-2011-0147448
Dec. 30, 2011 (KR) .......................... 10-2011-0147453
May 31, 2012 (KR) .......................... 10-2012-0058340

(51) Int. Cl.
*G10L 15/22* (2006.01)
*H04N 21/422* (2011.01)
(Continued)

(52) U.S. Cl.
CPC .......... *H04N 21/42204* (2013.01); *G06F 3/167* (2013.01); *G10L 15/22* (2013.01);
(Continued)

(58) Field of Classification Search
USPC .................................. 704/275; 715/715–732
See application file for complete search history.

(56) References Cited

U.S. PATENT DOCUMENTS 5,774,859 A * 6/1998 Houser et al. ................. 704/275
6,762,692 B1   7/2004 Mingot et al.
(Continued)

FOREIGN PATENT DOCUMENTS

JP       9-322086 A     12/1997
JP       10133849 A      5/1998
(Continued)

OTHER PUBLICATIONS

Communication dated Jan. 30, 2013 issued by the European Patent Office in counterpart European Patent Application No. 12187522.3.
(Continued)

*Primary Examiner* — Abul Azad
(74) *Attorney, Agent, or Firm* — Sughrue Mion, PLLC

(57) ABSTRACT

An electronic apparatus and a method of controlling the electronic apparatus are provided. The method includes: receiving a voice command; and if the voice command is a first voice start command, changing a mode of the electronic apparatus to a first voice task mode in which the electronic apparatus is controlled according to further voice input, and if the voice command is a second voice start command, changing the mode of the electronic apparatus to a second voice task mode in which the electronic apparatus is controlled according to the further voice input received via an external apparatus which operates with the electronic apparatus. Therefore, providing efficiency and flexibility in controlling the electronic apparatus by using a microphone of the electronic apparatus or a microphone of the external apparatus.

15 Claims, 12 Drawing Sheets

(51) Int. Cl.
  *G06F 3/16* (2006.01)
  *H04N 21/47* (2011.01)
  *G10L 21/06* (2013.01)
  *G10L 15/30* (2013.01)

(52) U.S. Cl.
  CPC ......... *G10L 21/06* (2013.01); *H04N 21/42203* (2013.01); *H04N 21/47* (2013.01); *G10L 15/30* (2013.01); *G10L 2015/225* (2013.01); *G10L 2015/228* (2013.01)

(56) References Cited

U.S. PATENT DOCUMENTS

| | | | |
|---|---|---|---|
| 7,080,014 B2 | 7/2006 | Bush et al. | |
| 7,254,543 B2 | 8/2007 | Ibaraki et al. | |
| 7,519,534 B2 | 4/2009 | Maddux et al. | |
| 7,873,466 B2 * | 1/2011 | Kong | 701/443 |
| 8,650,036 B2 * | 2/2014 | Han et al. | 704/275 |
| 2002/0052746 A1 | 5/2002 | Handelman | |
| 2002/0161572 A1 | 10/2002 | Kusumoto | |
| 2003/0014261 A1 * | 1/2003 | Kageyama | 704/275 |
| 2006/0041926 A1 * | 2/2006 | Istvan et al. | 725/133 |
| 2007/0033055 A1 | 2/2007 | Tanaka | |
| 2007/0136752 A1 | 6/2007 | Sanders | |
| 2008/0101556 A1 | 5/2008 | Kim et al. | |
| 2011/0270615 A1 | 11/2011 | Jordan et al. | |
| 2011/0282673 A1 * | 11/2011 | Di Profio et al. | 704/275 |
| 2012/0226502 A1 * | 9/2012 | Ouchi et al. | 704/275 |
| 2013/0021362 A1 * | 1/2013 | Sakurada et al. | 345/589 |
| 2013/0041665 A1 * | 2/2013 | Jang et al. | 704/246 |

FOREIGN PATENT DOCUMENTS

| | | |
|---|---|---|
| JP | 200062549 A | 2/2000 |
| JP | 2000112497 A | 4/2000 |
| JP | 2008256802 A | 10/2008 |
| KR | 1997-0057020 A | 7/1997 |
| KR | 10-2008-0038896 A | 5/2008 |
| KR | 1020100011786 A | 2/2010 |
| KR | 10-2011-0130951 A | 12/2011 |
| WO | 02/11122 A1 | 2/2002 |
| WO | 03/030148 A1 | 4/2003 |

OTHER PUBLICATIONS

Communication dated Feb. 21, 2013 issued by the Korean Patent Office in counterpart Korean Patent Application No. 10-2012-0058340.
Communication dated Mar. 12, 2013 issued by the International Searching Authority in counterpart International Patent Application No. PCT/KR2012/009896.
Communication, dated Jun. 11, 2013, issued by the Japanese Patent Office in counterpart Japanese Application No. 2012-267779.
Communication, Issued by the European Patent Office, Dated Jun. 25, 2014, In counterpart European Application No. 12187522.3.
Communication, issued by the Australian Intellectual Property Office, Dated Jul. 31, 2014, In counterpart Australian Application No. 2012261686.
Communication, Issued by the State Intellectual Property Office of P.R. China, Dated Sep. 2, 2014, In counterpart Chinese Application No. 201210425423.9.
Communication dated Mar. 24, 2015 issued by the European Patent Office in counterpart European Patent Application No. 14200231.0.
Communication dated Jul. 21, 2015 issued by the Chinese Patent Office in counterpart Chinese Application No. 201210425423.9.

* cited by examiner

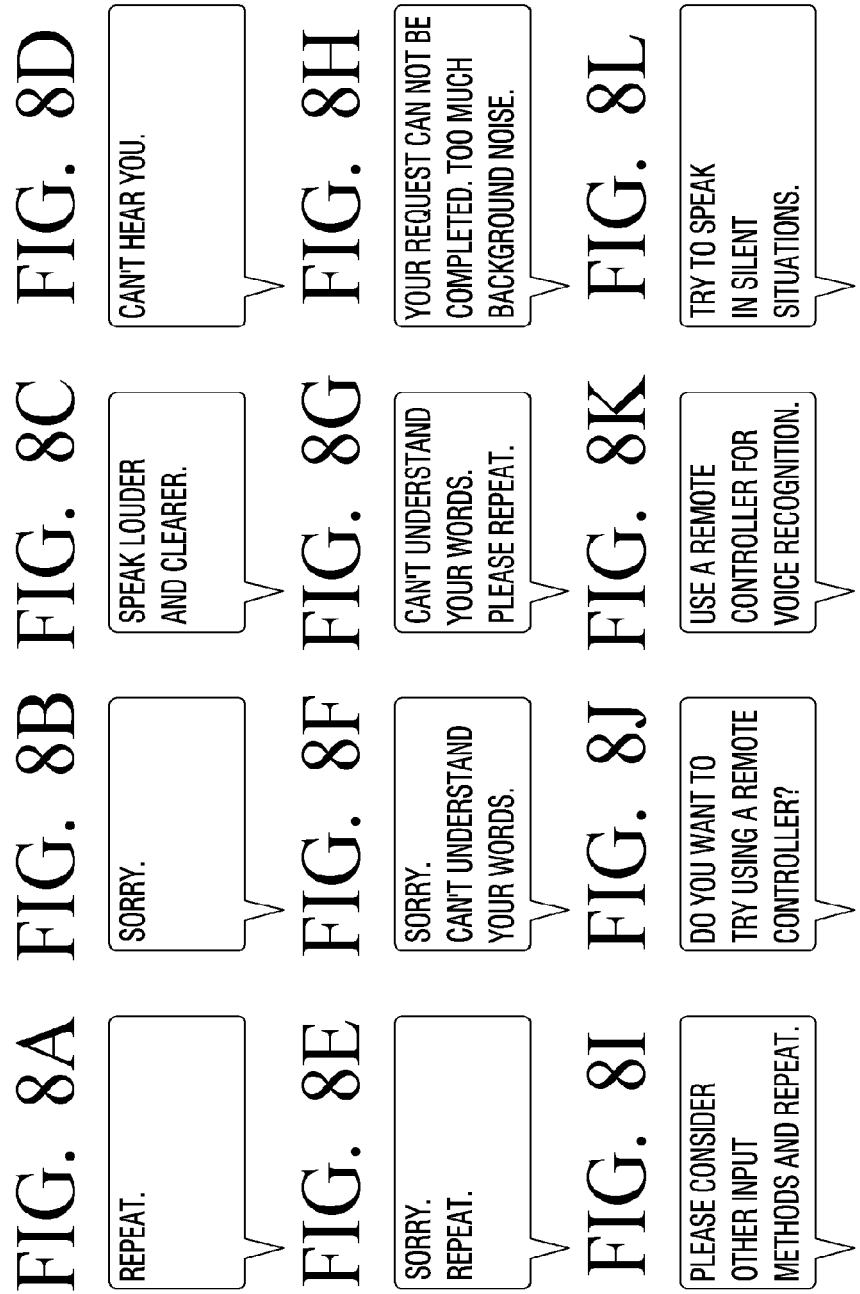

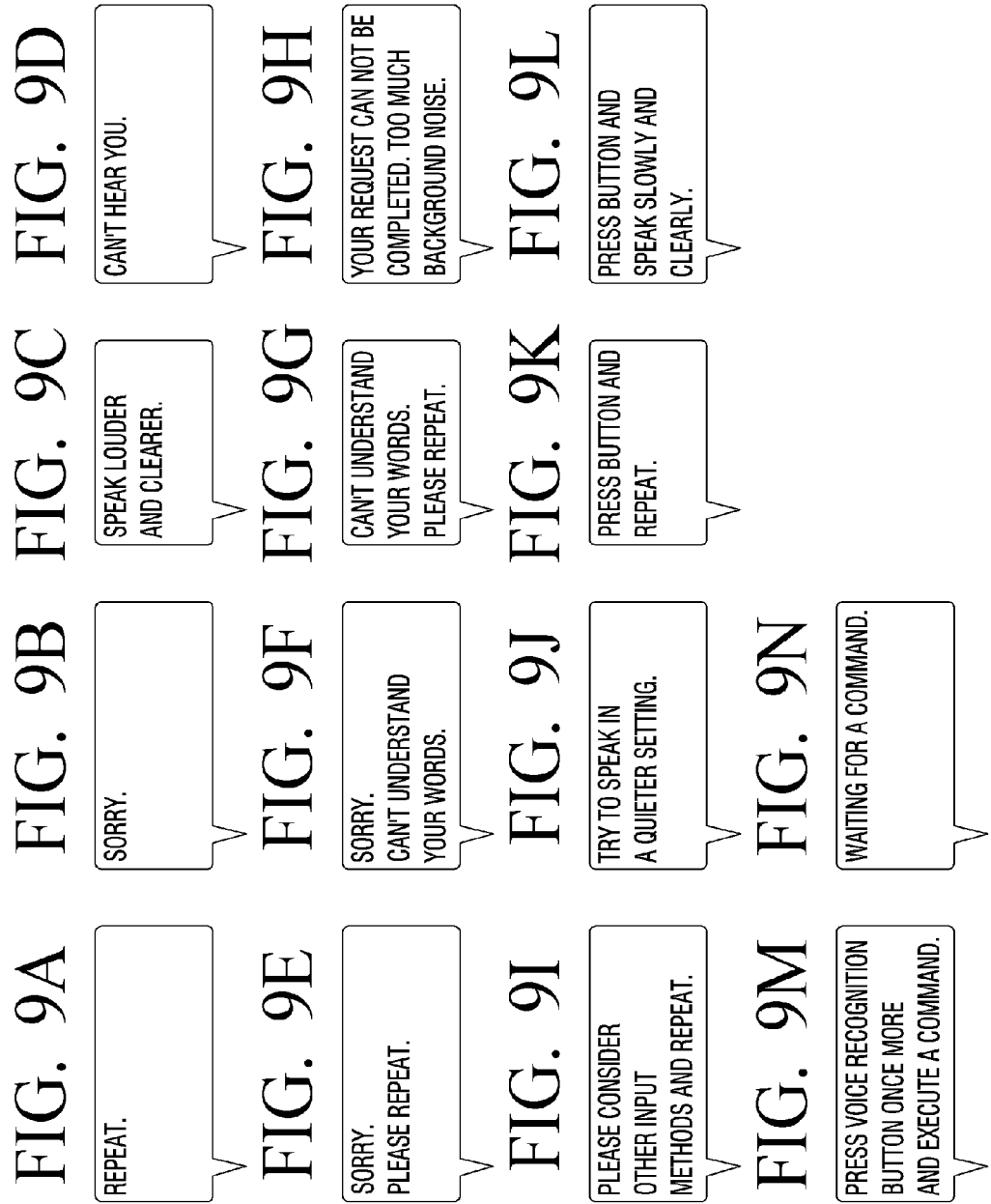

FIG. 10A TAKE YOUR HAND OFF THE BUTTON.

FIG. 10B TAKE YOUR HAND OFF THE BUTTON PRIOR TO SPEAKING A COMMAND.

FIG. 10C TAKE YOUR HAND OFF THE BUTTON PRIOR TO STARTING VOICE RECOGNITION.

FIG. 10D ARE YOU STILL PRESSING THE BUTTON?

FIG. 10E RECOGNITION CAN NOT START UNTIL YOU RELEASE THE BUTTON.

FIG. 10F IS THE BUTTON STILL BEING PRESSED?

FIG. 10G CHECK WHETHER THE BUTTON IS STILL BEING PRESSED.

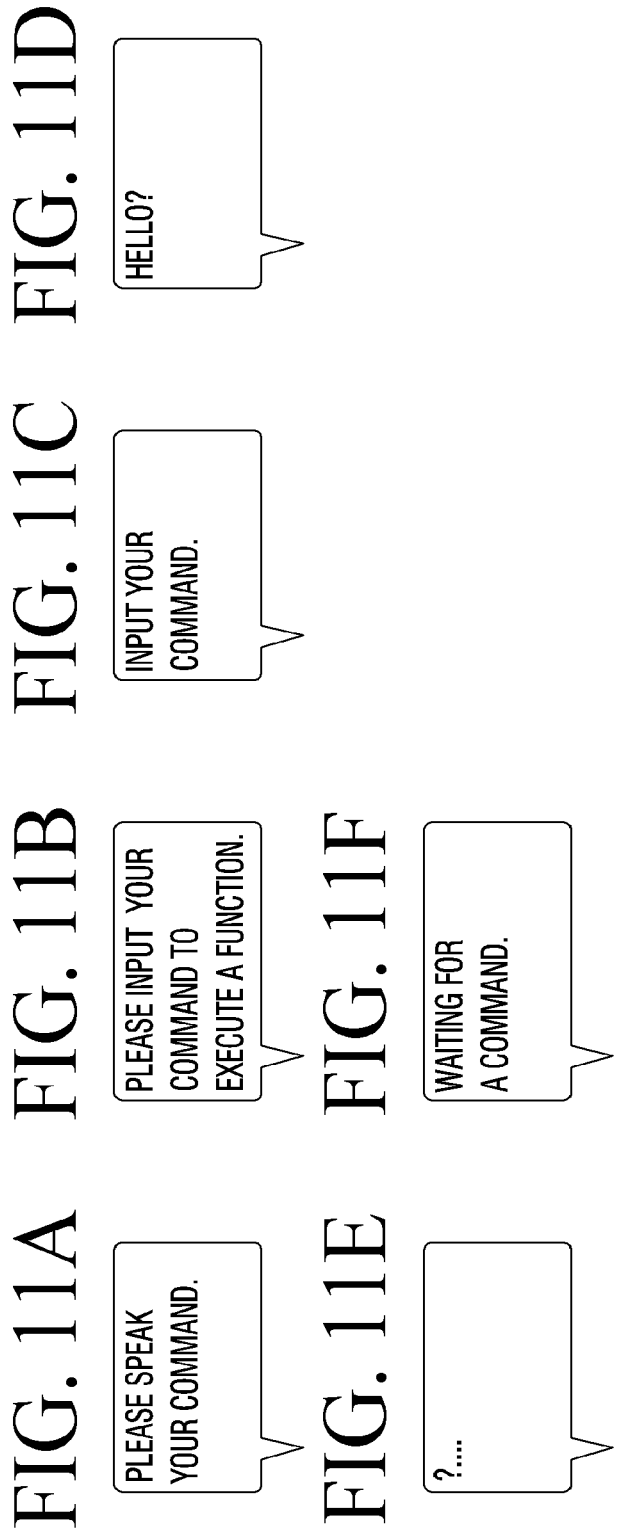

ELECTRONIC APPARATUS AND METHOD OF CONTROLLING ELECTRONIC APPARATUS

CROSS-REFERENCE TO RELATED APPLICATIONS

This application is a Continuation Application of U.S. application Ser. No. 14/152,011 filed Jan. 10, 2014 which is a Continuation of application Ser. No. 13/648,314 filed Oct. 10, 2012, now U.S. Pat. No. 8,650,036 issued Feb. 11, 2014, which claims priority under 35 U.S.C. §119 from the Korean Patent Application Nos. 10-2011-0147448, 10-2011-0147453, and 10-2012-0058340, respectively filed on Dec. 30, 2011, Dec. 30, 2011, and May 31, 2012, in the Korean Intellectual Property Office, the disclosures of which are incorporated herein by reference in their entirety.

BACKGROUND

1. Field

Exemplary embodiments generally relate to an electronic apparatus and a method of controlling the electronic apparatus, and more particularly, to an electronic apparatus which is controlled according to a user voice input through a voice input unit, and a method of controlling the electronic apparatus using a voice input.

2. Description of the Related Art

Recent technological developments increased supply of various types of electronic apparatuses. In particular, various types of electronic apparatuses including a TV have been used in consumer homes. The functions of these electronic apparatuses have gradually expanded according to requests of users. For example, a TV can connect to the Internet to support an Internet service. Also, a user views a larger number of digital broadcast channels through the TV.

Therefore, various input methods for efficiently using various functions of an electronic apparatus are required. For example, an input method using a remote controller, an input method using a mouse, an input method using a touch pad, etc. are applied to the electronic apparatus.

However, it is difficult to efficiently use the various functions of the electronic apparatus by using only this simple method. For example, if all functions of the electronic apparatus are realized to be controlled through only a remote controller, increasing the number of buttons of the remote controller is inevitable. In this case, it is not easy for an average user to learn how to use the remote controller and a chance of pressing a wrong button increases. Also, according to a method of displaying various menus on a screen to assist a user to search for and select a corresponding menu, the user is to check a complicated menu tree in order to select a desired menu which may be difficult and confusing to a user.

Therefore, a technology using voice recognition has been developed to further conveniently and intuitively control an electronic apparatus. Examples of a method of controlling an electronic apparatus by using voice recognition include a method of controlling an electronic apparatus by using a microphone of the electronic apparatus and a method of controlling an electronic apparatus by using a microphone of an external apparatus (e.g., a remote controller) which operates with the electronic apparatus.

However, if an electronic apparatus simultaneously uses two voice input methods, a user may not know which microphone to use to control the electronic apparatus. Also, since functions of the electronic apparatus controlled by using the two voice input methods are different from each other, different user interfaces (UIs) are to be provided to the user.

In addition, a voice of the user is not always correctly recognized due to the limitations in a voice recognition technology. Moreover, an error may occur in voice recognition due to the surroundings or an unskilled operation. Accordingly, a method of showing a user such a voice recognition error is required.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide an electronic apparatus which provides different voice task modes according to a voice command and which displays different voice guide information corresponding to each of the different voice task modes, and a method of controlling the electronic apparatus using the same.

Exemplary embodiments also provide an electronic apparatus which selects and displays one of a plurality of feedback messages for showing a voice recognition error, and a method of controlling the electronic apparatus using the same.

According to an aspect of the exemplary embodiments, there is provided a method of controlling an electronic apparatus. The method may include: receiving a voice input; and if the voice input is a first voice command, changing a mode of the electronic apparatus to a first voice task mode in which the electronic apparatus received further voice input, and if the voice input is a second voice command, changing the mode of the electronic apparatus to a second voice task mode in which said further voice input is received via an external apparatus which operates with the electronic apparatus.

The method may further include: if the mode of the electronic apparatus is changed to the first voice task mode, displaying first voice guide information corresponding to the first voice task mode, and if the mode of the electronic apparatus is changed to the second voice task mode, displaying second voice guide information corresponding to the second voice task mode.

The first voice guide information may include a plurality of voice items which guide a user to provide said further voice input in the first voice task mode. The second voice guide information may include a plurality of voice items which guide the user to provide said further voice input in the second voice task mode. At least one of the plurality of voice items of the second voice guide information may be different from the plurality of voice items of the first voice guide information.

The first voice guide information may include a first voice item of the plurality of voice items which is an instruction to perform a channel up/down command with respect to the electronic apparatus. The second voice guide information may exclude the first voice item and may include a second voice item which is an instruction to provide a channel list.

The first voice guide information may include an icon area which indicates that the electronic apparatus is in the first voice task mode. The second voice guide information may include an icon area which indicates that the electronic apparatus is in the second voice task mode.

If the electronic apparatus is switched to the second voice task mode, receiving input indicating that a preset button of the external apparatus is pressed and said further voice input is received by the external apparatus and provided to the electronic apparatus.

The first voice command may be a preset word, and the second voice command may be said further voice input after receiving input indicating that a preset button of the external apparatus was pressed.

The external apparatus may be a remote controller.

According to another aspect of exemplary embodiments, there is provided an electronic apparatus including: a voice input unit which receives voice input; and a controller which controls the electronic apparatus based on the voice input received by the voice input unit. If the voice input is a first voice command, the controller changes a mode of the electronic apparatus to a first voice task mode in which the voice input unit of the electronic apparatus receives further voice input, and if the voice input is a second voice command, the controller changes the mode of the electronic apparatus to a second voice task mode in which said further voice input is received by the external apparatus which operates with the electronic apparatus.

The electronic apparatus may further include a display unit. The controller may control the display unit to display first voice guide information in the first voice task mode and to display second voice guide information in the second voice task mode.

The first voice guide information may include a plurality of voice items which guide a user to provide said further voice input in the first voice task mode. The second voice guide information may include a plurality of voice items which guide a user to provide said further voice input in the second voice task mode. At least one of the plurality of voice items of the second voice guide information may be different from the plurality of voice items of the first voice guide information.

The first voice guide information may include a first voice item among the plurality of voice items which is an instruction to perform a channel up/down with respect to the electronic apparatus. The second voice guide information may exclude the first voice item and may include a second voice item which is to provide a channel list.

The first voice guide information may include an icon area which indicates that the electronic apparatus is in the first voice task mode. The second voice guide information may include an icon area which indicates that the electronic apparatus is in the second voice task mode.

The second voice task mode may be receiving input indicating that a preset button of the external apparatus is pressed and may be the further voice input received by the external apparatus The first voice command may be a preset word. The second voice command may be said further voice input after receiving input indicating that a preset button of the external apparatus was pressed.

The external apparatus may be a remote controller.

According to another aspect of exemplary embodiments, there is provided a method of controlling an electronic apparatus. The method may include: receiving a voice input; if the voice input is received, changing a mode of the electronic apparatus to a voice task mode; and if a voice recognition error occurs in the voice task mode, outputting one of a plurality of feedback messages which indicate the voice recognition error.

The method may further include: if the voice recognition error repeatedly occurs in the voice task mode, randomly selecting and outputting one of the plurality of feedback messages.

The voice task mode may include a first voice task mode in which the electronic apparatus is controlled according to further voice input and a second voice task mode which is controlled according to said further voice input received via an external apparatus which operates with the electronic apparatus.

Different ones of the plurality of feedback messages may be selected according to a type of the voice task mode.

Different ones of the plurality of feedback messages may be selected according to a type of the voice recognition error.

The voice recognition error may include at least one of an error in recognizing said further voice input, an error in pressing a button of the external apparatus for a preset time after said further voice input, and an error in providing said further voice input for a preset time after the button of the external apparatus is pressed.

The outputting the one of the plurality of feedback messages may include: if the voice recognition error occurs for the first time, displaying a default feedback message.

According to yet another aspect of exemplary embodiments, there is provided an electronic apparatus including: a voice input unit which receives voice input; and a controller which controls the electronic apparatus based on the voice input received by the voice input unit. If the voice input is received by the voice input unit, the controller changes a mode of the electronic apparatus to a voice task mode, and if a voice recognition error occurs in the voice task mode, the controller provides one of a plurality of feedback messages which indicate the voice recognition error.

If the voice recognition error repeatedly occurs in the voice task mode, the controller may randomly select and output one of the plurality of feedback messages.

The voice task mode may include a first voice task mode in which the electronic apparatus is controlled according to further voice input and a second voice task mode in which the electronic apparatus is controlled according to said further voice input received via an external apparatus which operates with the electronic apparatus.

Different ones of the plurality of feedback messages may be selected according to a type of the voice task mode.

Different ones of the plurality of feedback messages may be selected according to a type of the voice recognition error.

The voice recognition error may include at least one of an error in recognizing said further voice input, an error in pressing a button of the external apparatus for a preset time after said further voice input, and an error in providing said further voice input for a preset time after the button of the external apparatus is pressed.

If the voice recognition error occurs for the first time, the controller may output a default feedback message on the display unit.

BRIEF DESCRIPTION OF THE DRAWINGS

The above and/or other aspects will be more apparent by describing certain exemplary embodiments with reference to the accompanying drawings, in which:

FIGS. 8A through 11F are views illustrating feedback messages which are displayed according to voice task modes and voice error types, according to various exemplary embodiments.

DETAILED DESCRIPTION OF THE EXEMPLARY EMBODIMENTS

Figure 1:
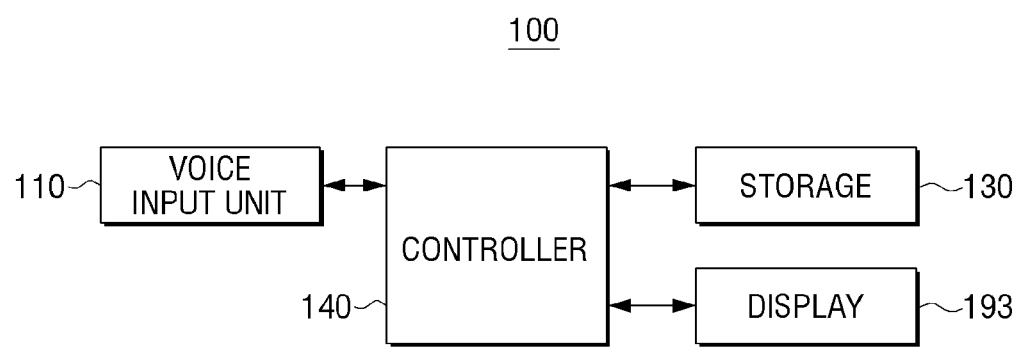
FIGS. 1 through 3 are block diagrams illustrating a structure of an electronic apparatus according to various exemplary embodiments.

Exemplary embodiments are described in greater detail with reference to the accompanying drawings.

In the following description, the same drawing reference numerals are used for the same or analogous elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a schematic block diagram illustrating an electronic apparatus 100 according to an exemplary embodiment.

Referring to FIG. 1, the electronic apparatus 100 includes a voice input unit 110, a storage 130, a controller 140, and a display 193. Here, the electronic apparatus 100 may be realized as a smart TV, a set-top box, or a PC which may be connected to an external network, a digital TV, a portable phone, or the like but is not limited thereto. The exemplary electronic apparatus 100 may include one or more of a memory, a processor, a hardware input unit such as a keyboard, and a screen.

The voice input unit 110 receives a sound such as a verbal instruction uttered by a user. The voice input unit 110 converts an input voice signal into an electric signal and outputs the electric signal to the controller 140. For example, the voice input unit 110 may be realized as a microphone. Also, the voice input unit 110 may be installed in the electronic apparatus 100 or may be installed separately from the electronic apparatus 100. If the voice input unit 110 is installed separately from the electronic apparatus 100, the voice input unit 110 may be connected to the electronic apparatus 100 through a wire or wireless network.

In particular, the voice input unit 110 according to an exemplary embodiment may include a voice input unit (e.g., a microphone) of the electronic apparatus 100 and a voice input unit (e.g., a remote controller) of an external apparatus which operates with the electronic apparatus 100.

The storage 130 stores various types of data and programs which are to drive and control the electronic apparatus 100. The storage 130 stores a voice recognition module which recognizes the voice input obtained using the voice input unit 110 and a motion detection module which detects and recognizes a motion input through a motion input unit 120 (shown in FIG. 2). The storage 130 may include a voice database (DB) and a motion DB. The voice DB refers to a DB in which a preset voice and a voice task matching with the preset voice are recorded. The motion DB refers to a DB in which a preset motion and a motion task matching with the preset motion are recorded.

The display 193 displays an image corresponding to a broadcast signal received through a broadcast receiver. The display 193 may display image data (e.g., a moving picture) input through an external terminal input unit. The display 193 may display voice guide information for performing a voice task and motion guide information for performing a motion task under the control of the controller 140.

The controller 140 controls the voice input unit 110, the storage 130, and the display 193. Here, the controller 140 may include a module which is to control a central processing unit (CPU) and the electronic apparatus 100, and a read only memory (ROM) and a random access memory (RAM) which store data.

If the voice is input through the voice input unit 110, the controller 140 recognizes the voice by using the voice recognition module and the voice DB. A voice recognition may be classified into an isolated word recognition which is to divide each word according to a form of an input voice to recognize an uttered verbal sound, a continuous speech recognition which is to recognize continuous words, continuous sentences, and dialogic speeches, and a keyword spotting which is an intermediate form of the isolated word recognition and the continuous speech recognition and is to detect and recognize a predetermined keyword or key phrases.

If a user voice is input, the controller 140 detects a start and an end of a verbal sound uttered by a user within an input voice signal to determine a voice section. The controller 140 may calculate energy of the input voice signal and sort out an energy level of the voice signal according to the calculated energy to detect a voice section through dynamic programming. The controller 140 detects a phoneme, which is a minimum unit of a verbal sound, from the voice signal in the detected voice section based on an acoustic model to generate phoneme data. The controller 140 applies a Hidden Markov Model (HMM) probability model to the generated phoneme data to generate text information. However, a method of recognizing a voice of a user as described above is only an exemplary embodiment, and thus the voice of the user may be recognized by using other methods. Therefore, the controller 140 may recognize the voice of the user included in the voice signal.

The controller 140 performs a task for the electronic apparatus 100 by using the recognized voice as described above by way of an example. The task for the electronic apparatus 100 includes at least one of functions, which may be performed by the electronic apparatus 10, such as a channel change, a volume adjustment, a play of contents (e.g., a moving picture, music, a picture, etc.), Internet browsing, etc.

In particular, if a voice start command is input, the controller 140 determines whether the input voice start command is a first voice start command or a second voice start command. Here, the voice start command refers to a command requesting the electronic apparatus 100 to enter a voice task mode controlled by the user voice input through the voice input unit 110. In particular, the first voice start command may be a user voice command which includes a preset word input through the voice input unit 110 of the electronic apparatus 100. Also, the second voice start command may be input to an external apparatus and may be a user command to press a preset button of the external apparatus (e.g., the remote controller) which operates with the electronic apparatus 100. In detail, a particular user voice such as "Hi, TV" may be used as the voice start command, and the voice start command may be changed by a user using user settings. However, the first and second voice start commands are only an exemplary embodiment and thus may be realized as other types of voice start commands.

If it is determined that the voice start command is the first voice start command, the controller 140 changes the mode of the electronic apparatus 100 to a first voice task mode. Here, the first voice task mode is a voice task mode controlled according to a user voice input through the voice input unit of the electronic apparatus 100.

If it is determined that the voice start command is the second voice start command, the controller 140 changes the mode of the electronic apparatus 100 to the second voice task mode. The second voice task mode is a voice task mode controlled according to a user voice input into the external apparatus which operates with the electronic apparatus 100. In particular, in the second voice task mode, the voice of the user may be input when a voice input button of the external apparatus is pressed. Alternatively, in the second voice task mode, the voice input button of the external apparatus may be pressed and the user voice may be input, and then the voice input button may be pressed once again in order to input the voice of the user. However, this is only an exemplary embodiment, and thus the user voice may be input through the external apparatus by using other methods besides a method of recognizing a voice by using a button of the external apparatus. For example, the user voice may be input only if a switch of the external apparatus is turned on.

In particular, in the first voice task mode, the electronic apparatus 100 may not be controlled by the voice of the user input into the external apparatus. Also, in the second voice task mode, the electronic apparatus 100 may not be controlled by a user voice input into the voice input unit of the electronic apparatus 100.

If the mode of the electronic apparatus 100 is changed to the voice task mode, the controller 140 displays voice guide information corresponding to the voice task mode. Here, the voice guide information displays at least one voice item which provides a voice command and a corresponding function that will be executed by the electronic apparatus 100.

In particular, if the mode of the electronic apparatus 100 is changed to the first voice task mode, the controller 140 displays first voice guide information corresponding to the first voice task mode. Also, if the mode of the electronic apparatus 100 is changed to the second voice task mode, the controller 140 displays second voice guide information corresponding to the second voice task mode.

The first voice guide information and the second voice guide information will be described in more detail with reference to FIGS. 4 and 5.

Figure 4:
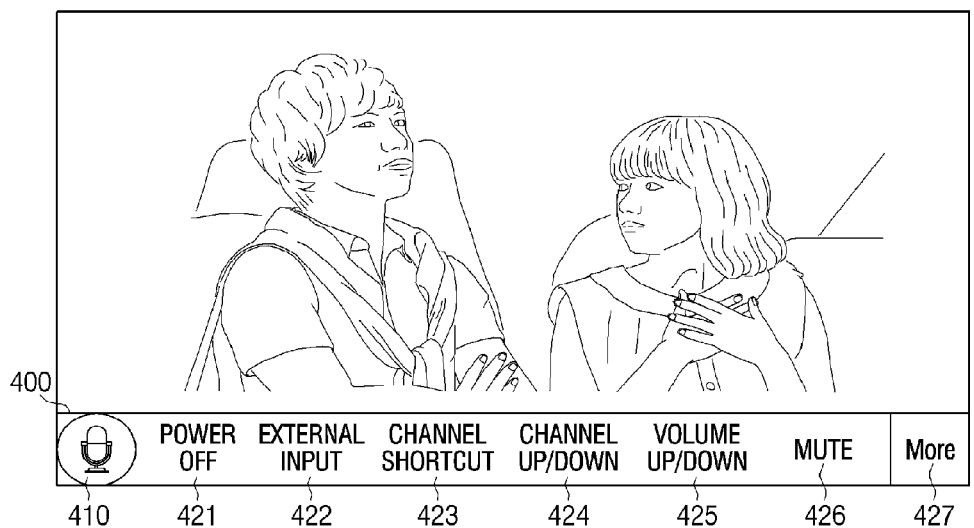
FIG. 4 is a view illustrating first voice guide information which is displayed in a first voice task mode in which a user voice is input through a voice input unit of an electronic apparatus, according to an exemplary embodiment.

FIG. 4 is a view illustrating first voice guide information according to an exemplary embodiment.

As shown in FIG. 4, first voice guide information 400 is displayed in a lower end of a screen on which a broadcast image is displayed. Also, the first voice guide information 400 includes an icon 410 which acknowledges that a current mode of a display apparatus is a first voice task mode and a plurality of voice items 421 through 427 which guide a user with inputting voice commands. The plurality of voice items 421 through 427 include a power off voice item 421, an external input voice item 422, a channel shortcut voice item 423, a channel up/down voice item 424, a volume up/down voice item 425, a mute voice item 426, and a MORE voice items 427. The MORE voice item 427 is an item which is to show more voice items instead or in addition to the ones already displayed.

Here, the icon 410 indicates that the current mode of the display apparatus is the first voice task mode and may be depicted as a microphone shape, as shown in FIG. 4 by way of an example.

In particular, the first voice guide information 400 may include a voice item corresponding to a button of a remote controller which may be pressed once to be executed. For example, the first voice guide information 400 may include the channel up/down voice item 424, the volume up/down voice item 425, the mute voice item 426, etc.

Figure 5:
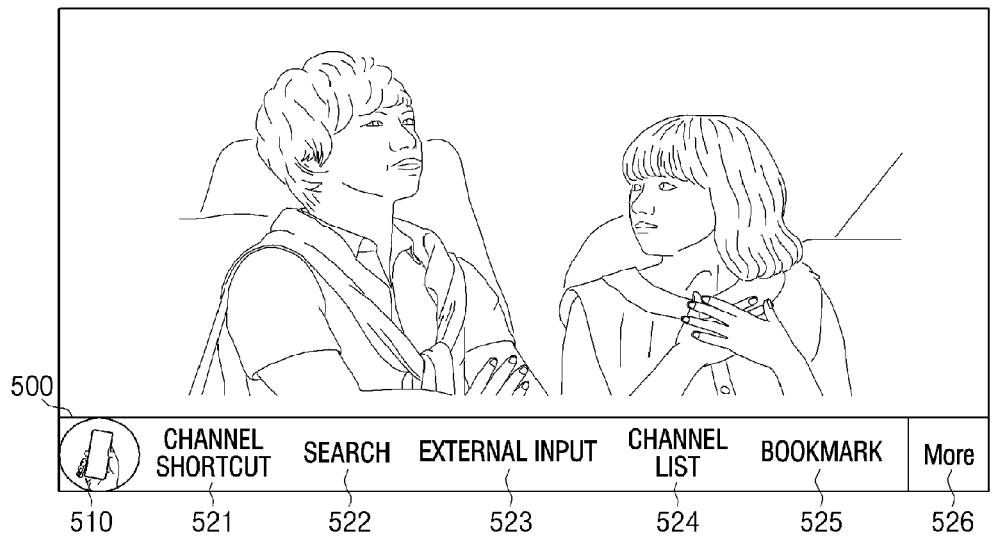
FIG. 5 is a view illustrating second voice guide information which is displayed in a second voice task mode in which a user voice is input through a voice input unit of an external apparatus which operates with an electronic apparatus, according to an exemplary embodiment.

FIG. 5 is a view illustrating second voice guide information 500 according to an exemplary embodiment.

As shown in FIG. 5, the second voice guide information 500 is displayed in a lower end of a screen which displays a broadcast image and is the same area as an area displaying the first voice guide information 400. Also, the second voice guide information 500 includes an icon 510 and a plurality of voice items 521 through 526. The icon 510 acknowledges that a current mode of a display apparatus is a second voice task mode e.g., input verbal commands to an external apparatus such as a remote controller, and the plurality of voice items 521 through 526 guide a user with inputting voice commands. The plurality of voice items 521 through 526 include a channel shortcut voice item 521, a search voice item 522, an external input voice item 523, a channel list voice item 524, a bookmark voice item 525, and a MORE voice item 526. Here, the bookmark voice item 525 is a voice item which requests displaying a menu including a function (e.g., a particular application execution) frequently used by the user.

Here, the icon 510 indicates that the current mode of the display apparatus is the second voice task mode and may be depicted as a remote controller shape, as shown in FIG. 5, by way of an example, and which is different from the microphone shape of the icon 410 shown in FIG. 4. Therefore, the user may check whether a current voice task mode is a first voice task mode or a second voice task mode, based on the icons 410 and 510 of the first and second voice guide information 400 and 500, respectively.

Also, some of the plurality of voice items of the second voice guide information 500 may be different from the plurality of voice items of the first voice guide information 400. In particular, the second voice guide information 500 may not include a voice item corresponding to a button of a remote controller which may be pressed once to be executed. For example, the second voice guide information 500 may not include the channel up/down voice item 424, the volume up/down voice item 425, the mute voice item 426, etc. This is because the user holds the remote controller in the second voice task mode and thus it is further convenient for the user to press the button of the remote controller rather than to speak.

Instead of this, the second voice guide information 500 may include voice items which may be difficult to find i.e., items that would require the user to go through one or more menus to find, such as the search voice item 522, the external input voice item 523, the channel list voice item 524, and the bookmark voice item 525.

In other words, as described above, different types of voice guide information may be provided according to first and second voice task modes. Therefore, the user may efficiently and conveniently control the electronic apparatus 100 according to a plurality of voice task modes.

If one of the first voice guide information 400 and the second voice guide information 500 is displayed, the controller 140 controls the electronic apparatus 100 according to a user input which is input into the voice input unit 110 in a corresponding voice task mode. For example, if user voice "mute" is input through the voice input unit 110 when the first voice guide information 400 is displayed, the controller 140 may set a volume level of the electronic apparatus 100 to "0." Also, if user voice "channel list" is input through the voice input unit 110 when the second voice guide information 500 is displayed, the controller 140 may display a channel list on the display unit 193.

Figure 2:
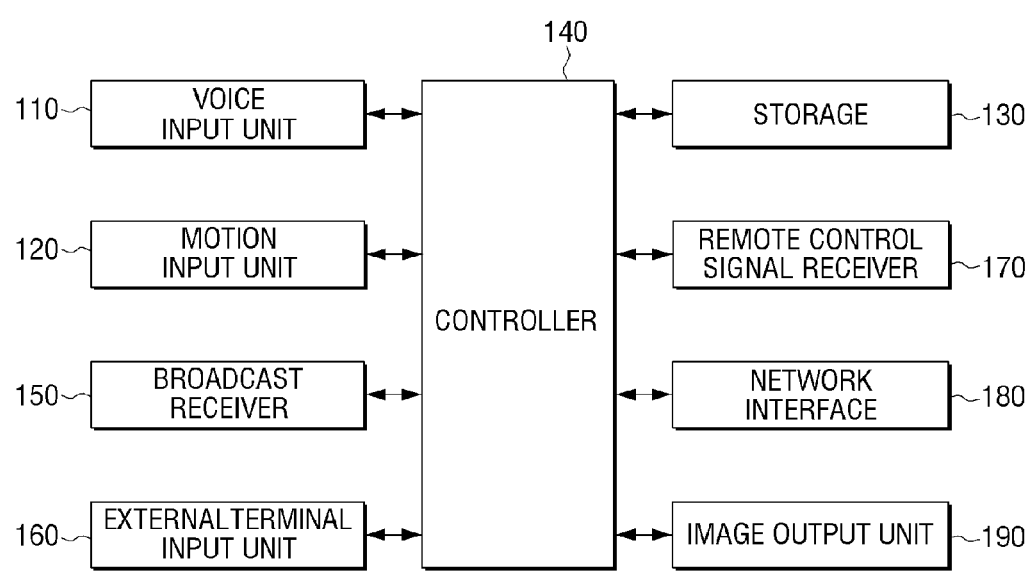

FIG. 2 is a block diagram illustrating a structure of the electronic apparatus 100, according to another exemplary embodiment. Referring to FIG. 2, the electronic apparatus 100 includes a voice input unit 110, a motion input unit 120, a storage 130, a controller 140, a broadcast receiver 150, an external terminal input unit 160, a remote control signal receiver 170, a network interface 180, and an image output unit 190. By way of an example and not by way of a limitation, the electronic apparatus 100 shown in FIG. 2 may be realized as a set-top box.

Descriptions of the voice input unit 110, the storage 130, and the controller 140 of FIG. 2 are analogous as those of the voice input unit 110, the storage 130, and the controller 140 of FIG. 1, and thus their detailed descriptions will be omitted.

The motion input unit 120 receives an image signal (e.g., a continuous frame) obtained by capturing a motion of a user and provides the image signal to the controller 140. For example, the motion input unit 120 may be realized as a unit which includes a lens and an image sensor. Also, the motion input unit 120 may be installed in the electronic apparatus 100 or may be installed separately from the electronic apparatus 100. The motion input unit 120 installed separately from the electronic apparatus 100 may be connected to the electronic apparatus 100 through a wire or wireless network.

The broadcast receiver 150 receives a broadcast signal from an external source by wire or wireless network. The broadcast signal includes video, audio, and additional data (e.g., an Electronic Program Guide (EPG)). The broadcast receiver 150 may receive the broadcast signal from various sources such as terrestrial broadcasting, cable broadcasting, satellite broadcasting, Internet broadcasting, etc.

The external terminal input unit 160 receives video data (e.g., a moving picture, etc.), audio data (e.g., music, etc.), etc. from the outside of the electronic apparatus 100. The external terminal input unit 160 may include at least one of a High-Definition Multimedia Interface (HDMI) input terminal 161, a component input terminal 162, a PC input terminal 163, and a universal serial number (USB) input terminal 164 (shown in FIG. 3). The remote control signal receiver 170 receives a remote control signal from an external remote controller. The remote control signal receiver 170 may receive the remote control signal even in a voice task mode or a motion task mode of the electronic apparatus 100.

The network interface 180 may connect the electronic apparatus 100 to an external apparatus (e.g., a server, another electronic apparatus, etc.) under control of the controller 140. The controller 140 may download an application from an external apparatus which is connected to the electronic apparatus 100 through the network interface 180 or may browse the external apparatus for the application. The network interface unit 180 may provide at least one of Ethernet 181, a wireless local area network (WLAN) 182, and Bluetooth 183.

The image output unit 190 outputs the broadcast signal received through the broadcast receiver 150, the video data input through the external terminal input unit 160, or video data stored in the storage 130, to an external electronic apparatus (e.g., a monitor or a TV). If a motion is input through the motion input unit 120, the controller 140 recognizes the motion by using a motion sensing module and a motion DB. A motion recognition is to divide an image (e.g., a continuous frame) corresponding to the motion of the user input through the motion input unit 120 into background and hand areas (e.g., spreading out fingers or clenching fists) by using a motion recognition module and recognize continuous motions of a hand. If a user motion is input, the controller 140 stores a received image in a frame unit and senses an object of the user motion by using the stored frame. The controller 140 senses at least one of a shape, a color, and a motion of the object of the frame to detect the object. The controller 140 may track a motion of the detected object by using positions of objects of a plurality of frames.

The controller 140 determines a motion according to a shape and movement of the tracked object. For example, the controller 140 determines a movement of a user by using at least one of a change, a speed, a position, and a direction of an object. The motion of the user includes a grab that is a motion of holding a hand, a pointing move that is a motion of moving a displayed cursor with a hand, a slap that is a motion of moving a hand in one direction at a predetermined speed or more, a shake that is a motion of shaking the hand to the left/right or up/down, and a rotation that is a motion of rotating the hand. The present disclosure may be applied to other types of motions besides the above-described exemplary embodiment. For example, a spread motion of spreading out a grabbed hand, etc. may further be included.

The controller 140 determines whether the object has left a determined area (e.g., a square of 40 cm×40 cm) within a determined time (e.g., 800 ms) in order to determine whether the motion of the user is the pointing move or the slap. If the object did not leave the determined area within the determined time, the controller 140 may determine the motion of the user as the pointing move. If the object has gotten out of the determined area within the determined time, the controller 140 may determine the motion of the user as the slap. According to another exemplary embodiment, if it is determined that the speed of the object is equal to or lower than a preset speed (e.g., 30 cm/s), the controller 140 determines the motion of the user as the pointing move. If it is determined that the speed of the object exceeds the preset speed, the controller 140 determines the motion of the user as the slap.

Figure 3:
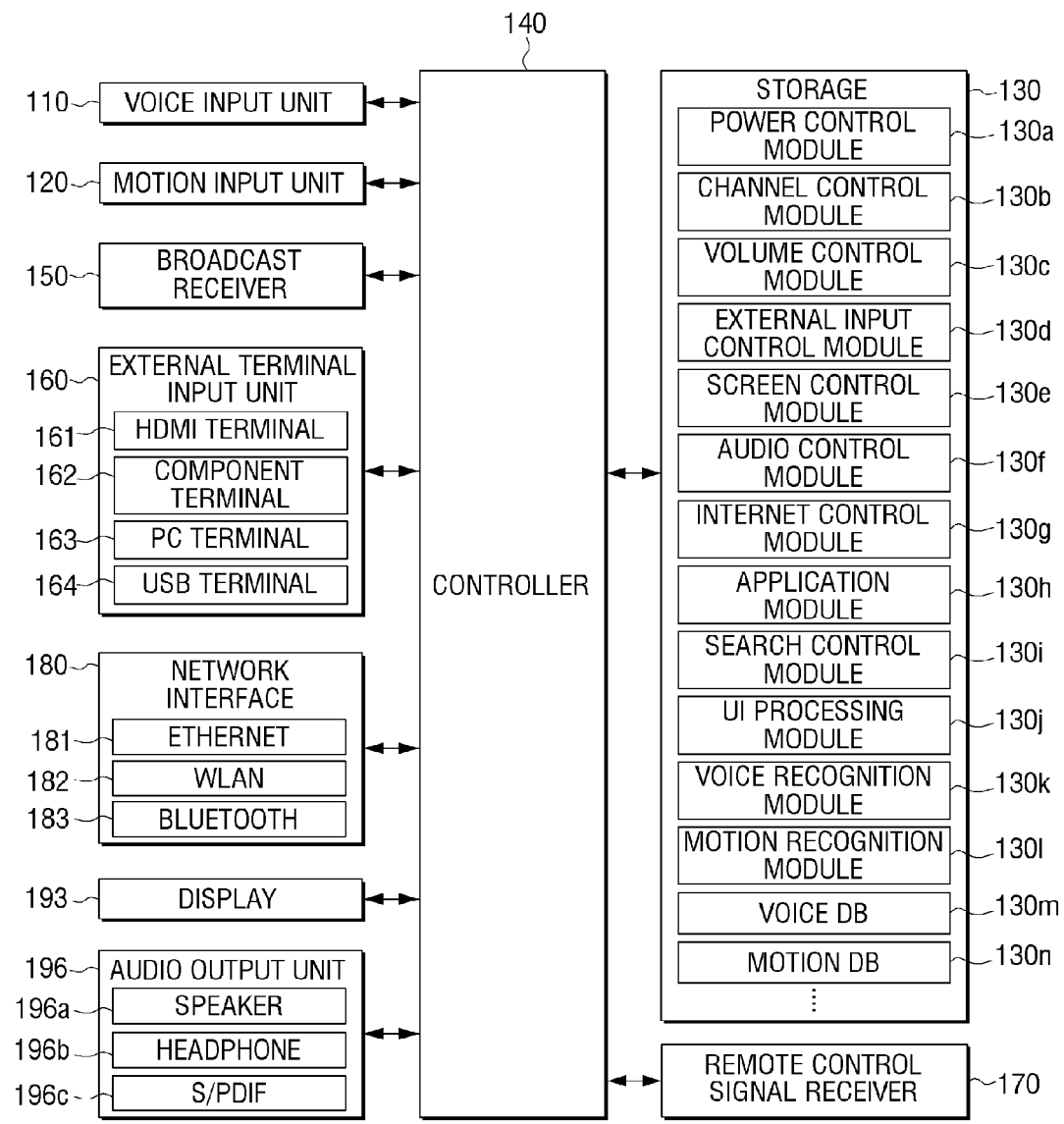

FIG. 3 is a block diagram of the electronic apparatus 100, according to another exemplary embodiment. As shown in FIG. 3, the electronic apparatus 100 includes a voice input unit 110, a motion input unit 120, a storage 130, a controller 140, a broadcast receiver 150, an external terminal input unit 160, a remote control signal receiver 170, a network interface 180, a display 193, and an audio output unit 196. By way of an example only, the electronic apparatus 100 may be a digital TV but is not limited thereto.

Descriptions of the voice input unit 110, the motion input unit 120, the storage 130, the controller 140, the broadcast receiver 150, the external terminal input unit 160, the remote control signal receiver 170, the network interface 180, and the display 193 of FIG. 3 are analogous to those of elements of FIGS. 1 and 2 having the same reference numerals. Therefore, their detailed descriptions will be omitted herein.

The audio output unit 196 outputs a voice corresponding to a broadcast signal under control of the controller 140. The audio output unit 196 may include at least one of a speaker 196a, a headphone output terminal 196b, and a Sony/Philips Digital Interface (S/PDIF) output terminal 193c.

As shown in FIG. 3, the storage 130 includes a power control module 130a, a channel control module 130b, a volume control module 130c, an external input control module 130d, a screen control module 130e, an audio control module 130f, an Internet control module 130g, an application module 130h, a search control module 130i, a user interface (UI)

processing module 130*j*, a voice recognition module 130*k*, a motion recognition module 130*l*, a voice DB 130*m*, and a motion DB 130*n*. These modules 130*a* through 130*n* may be realized as pieces of software to respectively perform a power control function, a channel control function, a volume control function, an external input control function, a screen control function, an audio control function, an Internet control function, an application execution function, a search control function, and a UI processing function. The controller 140 may execute the pieces of software stored in the storage 130 to perform the corresponding functions. The above-described modules may, however, be realized by having respective, separate hardware for executing of the respective module.

A method of providing different task modes based on voice input methods according to an exemplary embodiment will now be described in more detail with reference to FIG. 6.

Figure 6:
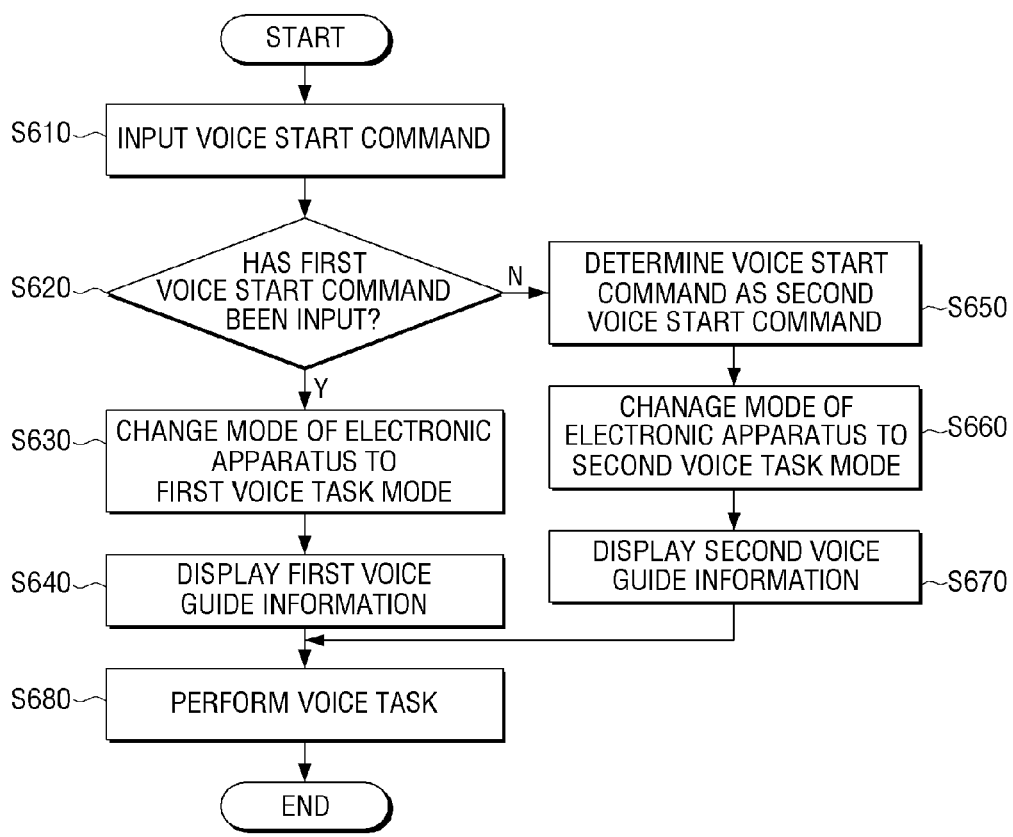
FIG. 6 is a flowchart illustrating a method of providing different voice task modes according to voice input methods, according to an exemplary embodiment.

Referring to FIG. 6, in operation S610, the electronic apparatus 100 receives a voice start command. Here, the voice start command is a command which requests the electronic apparatus 100 to enter a voice task mode controlled by a user voice input through the voice input unit 110. In particular, a first voice start command may be a user voice command which includes a preset word input through the voice input unit 110 of the electronic apparatus 100, and a second voice start command may be a user command which is to press a preset button of an external apparatus (e.g., a remote controller) which operates with the electronic apparatus 100.

In operation S620, the electronic apparatus 100 determines whether the voice start command is the first voice start command.

If it is determined in operation S620 that the voice start command is the first voice start command (Yes), the electronic apparatus 100 changes the mode of the electronic apparatus 100 to a first voice task mode in operation S630. Here, the first voice task mode is a mode in which the electronic apparatus 100 is controlled according to the user voice input through the voice input unit 110 of the electronic apparatus 100.

In operation S640, the electronic apparatus 100 displays first voice guide information. Here, the first voice guide information may include an icon indicating that a current mode of the electronic apparatus 100 is the first voice task mode and a plurality of voice items for performing various functions in the first voice task mode. Here, the plurality of voice items of the first voice guide information may include voice items, which may execute a function of the electronic apparatus 100 if a voice of a user is input, such as a channel up/down voice icon, a volume up/down voice icon, and a mute voice icon.

In operation S680, the electronic apparatus 100 performs a voice task by using the first voice guide information.

If it is determined in operation S620 that the voice start command is not the first voice start command (No), the electronic apparatus 100 determines that the voice start command is a second voice start command in operation S650.

In operation S660, the electronic apparatus 100 changes the mode of the electronic apparatus 100 to a second voice task mode. Here, the second voice task mode is a mode which is to control the electronic apparatus 100 according to a user voice input through the voice input unit 110 of the external apparatus (e.g., the remote controller) which operates with the electronic apparatus 100. In particular, in the second voice task mode, a preset second button (e.g., a voice input button) of the external apparatus may be pressed and then controlled by a user voice input into the external apparatus.

In operation S670, the electronic apparatus 100 displays second voice guide information. Here, the second voice guide information may include an icon indicating that the current mode of the electronic apparatus 100 is the second voice task mode and a plurality of voice items for performing various functions in the second voice task mode. Here, the icon indicating that the current mode of the electronic apparatus 100 is the second voice task mode is different from the icon indicating that the current mode of the electronic apparatus 100 is the first voice task mode. Also, the plurality of voice items of the second voice guide information may include voice items that are buried in layered menus such as an external input voice icon, a channel list voice icon, and a bookmark voice icon.

In operation S680, the electronic apparatus 100 performs the voice task by using the second voice guide information.

According to the above-described exemplary method of controlling the electronic apparatus 100, the user may further efficiently control the electronic apparatus 100 by using different types of voice input methods.

A method of outputting a feedback message if a voice recognition error occurs when a voice is input according to exemplary embodiments will now be described with reference to FIGS. 7 through 12.

In detail, if a voice start command is input, the controller 140 changes a mode of the electronic apparatus 100 to a voice task mode. Here, the voice task mode is a mode which is to control the electronic apparatus 100 through a user voice input through the voice input unit 110.

As described above, the voice start command may be a user voice command (hereinafter referred to as a first voice start command) which includes a preset word input through the voice input unit 110 of the electronic apparatus 100 or a user command (hereinafter referred to as a second voice start command) which is to press a preset button of an external apparatus (e.g., a remote controller) which operates with the electronic apparatus 100. In particular, if the first voice start command is input, the controller 140 changes the mode of the electronic apparatus 100 to a first voice task mode. Here, the first voice task mode is a voice task mode which is controlled according to a user voice input into a voice input unit of the electronic apparatus 100. If the second voice start command is input, the controller 140 changes the mode of the electronic apparatus 100 to a second voice task mode. The second voice task mode is a voice task mode which is controlled according to a user voice input into the external apparatus which operates with the electronic apparatus 100. In particular, in the second voice task mode, a voice of a user may be input when a voice input button of the external apparatus is pressed.

If the mode of the electronic apparatus 100 is changed to one of the first and second voice task modes, the controller 140 controls the display 193 to display voice guide information which guides a user voice input for performing functions in a voice task mode. Here, the voice guide information may be, by way of an example, one of the first voice guide information 400 of FIG. 4 and the second voice guide information 500 of FIG. 5.

Figure 7:
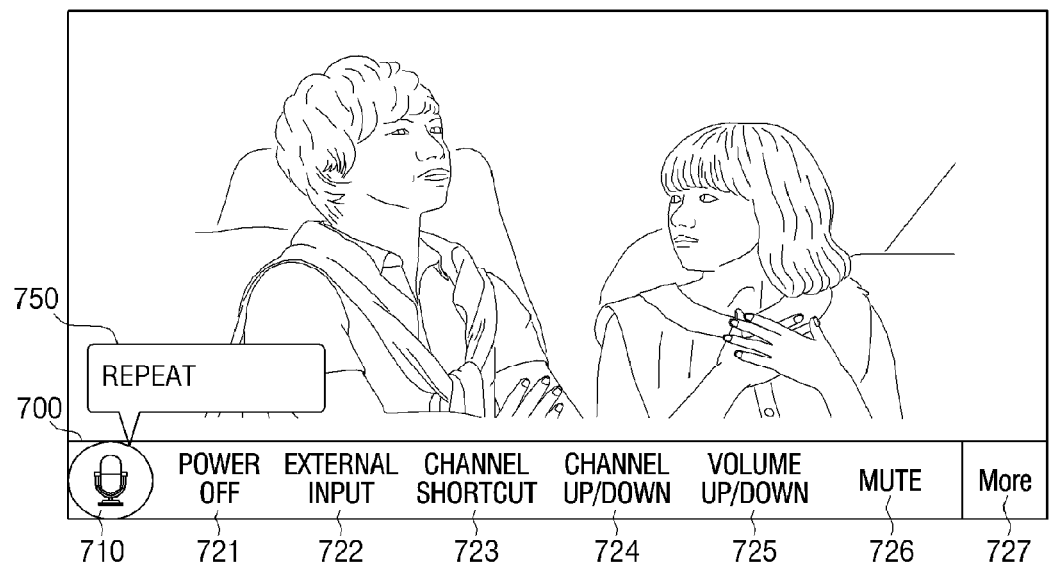
FIG. 7 is a view illustrating a feedback message if a voice recognition error occurs, according to an exemplary embodiment.

If a voice recognition error occurs when performing a voice task by using the voice guide information, the controller 140 displays a feedback message 750 which indicates the voice recognition error according to an exemplary embodiment, as shown in FIG. 7. In an exemplary embodiment, depicted in FIG. 7, the voice guide information includes an icon 710 indicating a first voice task mode e.g., the user is to input voice commands directly into the electronic apparatus 100. The voice guide information 700 further may include a number of voice items such as a power off voice item 721, an external input voice item 722, a channel shortcut voice item 723, a channel up/down voice item 724, a volume up/down voice item 725, a mute voice item 726, and a MORE voice items 727. The MORE voice item 727 is an item which when selected provides a user with additional voice items. Here, the case where the voice recognition error occurs may include at least one of a case where a volume of a user voice input through the voice input unit 110 is too low, a case where a voice DB does not include a command matching a recognition result of the user voice input through the voice input unit 110, and a case where the user is inexperienced in handling the electronic apparatus 100.

In particular, the controller 140 may display one of a plurality of feedback messages stored in the storage 130. In detail, the controller 140 may display different feedback messages according to voice task modes and types of voice recognition error.

In detail, the controller 140 may display a different feedback message based on whether a voice recognition error occurs in a first voice task mode or in a second voice task mode. For example, if the voice recognition error occurs in the first voice task mode, the controller 140 may display one of a plurality of feedback messages shown in FIGS. 8A-8L. If the voice recognition error occurs in the second voice task mode, the controller 140 may display one of a plurality of feedback messages shown in FIGS. 9A-9N, shown in FIGS. 10A-10G, FIGS. 11A-11F.

The controller 140 may also differently display the feedback message 750 according to a type of voice recognition error in the second voice task mode. For example, if the voice DB does not include the command matching the recognition result of the user voice input or the user voice is not recognized due to a voice volume being lower than a preset value, the controller 140 may display one of the plurality of feedback messages shown in FIGS. 9A-9N. If a voice input button of an external apparatus is continuously pressed after the user voice is input, the controller 140 may display one of the plurality of feedback messages shown in FIGS. 10A-10G. If the user voice is not input for a preset time after the voice input button of the external apparatus is pressed, the controller 140 may display one of the plurality of feedback messages shown in FIGS. 11A-11F.

The controller 140 may also display a default feedback message according to a voice task mode and a type of voice recognition error when error occurs during a first voice recognition. For example, if the voice recognition error occurs in the first voice task mode, the controller 140 may display the first feedback message shown in FIG. 8A "Repeat, please." among the plurality of feedback messages shown in FIGS. 8A-8L. If the user voice input in the second voice task mode is not recognized, the controller 140 may display the feedback message shown in FIG. 9A "Repeat, please." among the plurality of feedback messages shown in FIGS. 9A-9N. If the voice input button is pressed for a preset time even after the user voice is input in the second voice task mode, the controller 140 may display the feedback message shown in FIG. 10A "Take your hand off the button." among the plurality of feedback messages shown in FIGS. 10A-10G. If the voice input button is not pressed for a preset time after the user voice is input in the second voice task mode, the controller 140 may display the feedback message shown in FIG. 11A "Please speak your command." among the plurality of feedback messages shown in FIGS. 11A-11F.

As described above, the default feedback message according to the voice task mode and the type of voice recognition error may be set by the manufacturer and/or may later be changed by a user.

If the voice recognition error repeatedly occurs, the controller 140 may randomly display one of the other feedback messages except for the default feedback message. For example, if the voice recognition error repeatedly occurs in the first voice task mode, the controller 140 may randomly display one of the other feedback messages shown in FIGS. 8B-8L except for the feedback message shown in FIG. 8A. If the user voice input in the second voice task mode is repeatedly not recognized, the controller 140 may display one of the other feedback messages shown in FIGS. 9B-9N except for the feedback message 901 shown in FIG. 9A. If the voice input button is continuously pressed even after the user voice is input in the second voice task mode, the controller 140 may randomly display one of the other feedback messages shown in FIGS. 10B-10G except for the feedback message shown in FIG. 10A every preset time (e.g., every 10 seconds). If the user voice is not input for a preset time after the voice input button is pressed in the second voice task mode, the controller 140 may randomly display one of the other feedback messages shown in FIGS. 11B-11F except for the feedback message 1101 shown in FIG. 11A every preset time (e.g., every 10 seconds).

As described above, different feedback messages may be provided according to voice recognition errors and voice task modes. Therefore, the user may accurately determine the error in a voice recognition. Also, the user may obtain an effect of carrying a conversation with an electronic apparatus, and thus providing increased entertainment for the user.

A method of providing a feedback message if a voice recognition error occurs in the electronic apparatus 100 according to an exemplary embodiment will now be described in more detail with reference to FIG. 12.

Figure 12:
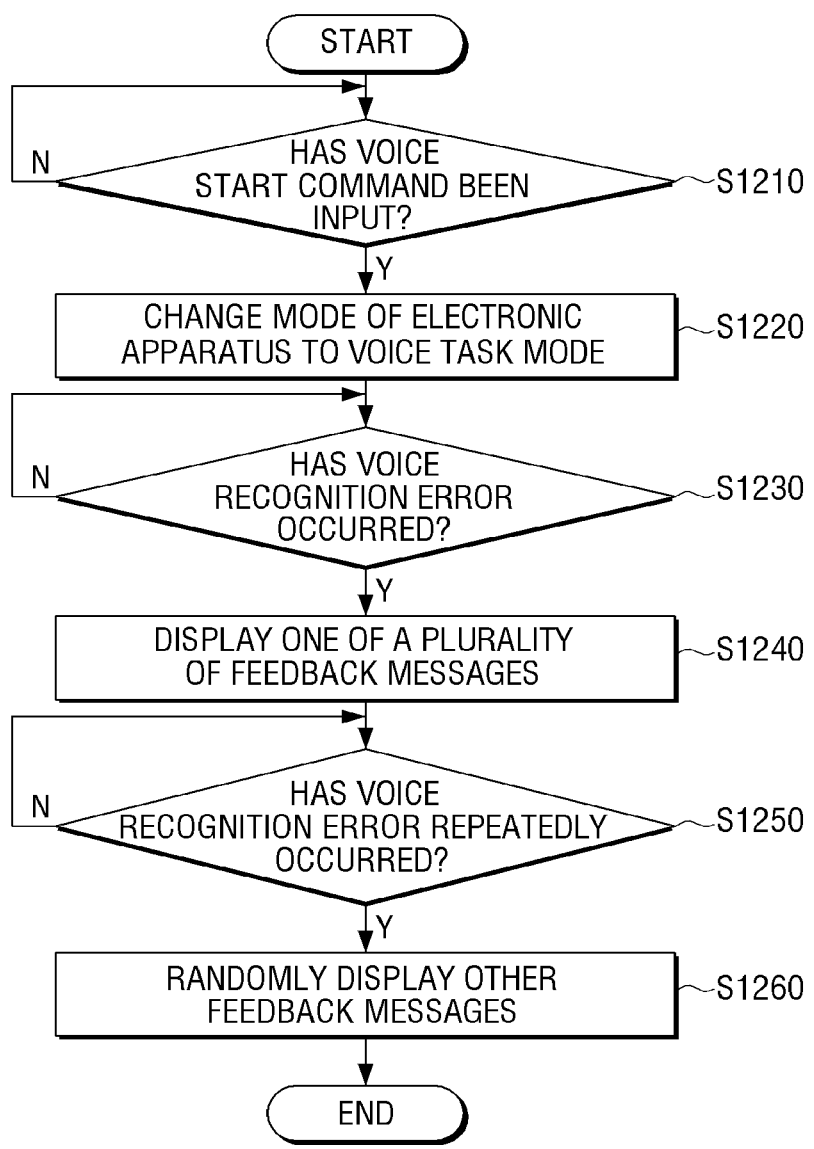
FIG. 12 is a flowchart illustrating a method of controlling an electronic apparatus according to an exemplary embodiment.

Referring to FIG. 12, in operation S1210, the electronic apparatus 100 determines whether a voice start command has been input. Here, the voice start command is a user command which is to change a mode of the electronic apparatus 100 to a voice task mode and may include first and second voice start commands. The first voice start command is a user voice command which includes a preset word input through the voice input unit 110 of the electronic apparatus 100, and the second voice start command is a user command which is to press a preset button of an external apparatus (e.g., a remote controller) which operates with the electronic apparatus 100.

If it is determined in operation S1210 that the voice start command has been input, the electronic apparatus 100 changes the mode thereof to the voice task mode in operation S1220. Here, if the voice start command is the first voice start command, the electronic apparatus 100 changes the mode thereof to a first voice task mode which is controlled by a user voice input through the voice input unit 110 of the electronic apparatus 100. If the voice start command is the second voice start command, the electronic apparatus 100 changes the mode thereof to a second voice task mode which is controlled by a user voice input through the voice input unit 110 of the external apparatus.

When the voice task mode is performed, the electronic apparatus 100 determines whether a voice recognition error has occurred, in operation S1230. Here, the case whether the voice recognition error occurs may include at least one of a case where the volume of the user voice input through the voice input unit 110 is lower than a preset value, a case where a voice DB does not include a command matching a recognition result of the user voice input through the voice input unit 110, and a case where the user is inexperienced in handling the electronic apparatus 100 and as such does not properly input the voice command.

If it is determined in operation S1230 that the voice recognition error has occurred, the electronic apparatus 100 displays one of a plurality of feedback messages in operation S1240. Here, the feedback messages may be differently displayed according to voice task modes and voice recognition errors. For example, if the voice recognition error occurs in the first voice task mode, the electronic apparatus 100 displays one of the plurality of feedback messages shown in FIGS. 8A-8K. If the voice recognition error occurs in the second voice task mode, the electronic apparatus 100 may display one of the plurality of feedback messages shown in FIGS. 9A through 11F. Here, if the voice recognition error occurs for the first time, the electronic apparatus 100 may display a default one of the plurality of feedback messages.

In operation S1250, the electronic apparatus 100 determines whether the voice recognition error has repeatedly occurred. In an exemplary embodiment, the electronic apparatus may determine whether a recognition error has occurred more times than a predetermined threshold.

If it is determined in operation S1250 that the voice recognition error has repeatedly occurred, the electronic apparatus 100 randomly displays the other ones of the plurality of feedback messages in operation S1260. For example, if the voice recognition error has repeatedly occurred in the first voice task mode, the electronic apparatus 100 may randomly display one of the other feedback messages shown in FIGS. 8B-8L except for the first feedback message shown in FIG. 8A. If the user voice input in the second voice task mode repeatedly cannot be recognized, the electronic apparatus 100 may display one of the other feedback messages shown in FIGS. 9B-9N except for the first feedback message shown in FIG. 9A. If the voice input button is continuously pressed even after the user voice is input in the second voice task, the electronic apparatus 100 may randomly display one of the other feedback messages shown in FIGS. 10B-10G except for the first feedback message shown in FIG. 10A at a preset time intervals (e.g., every 10 seconds). If the user voice is not continuously input for a preset time after the voice input button is pressed in the second task mode, the electronic apparatus 100 may randomly display one of the other feedback messages shown in FIGS. 11B-11F except for the first feedback message 1101 shown in FIG. 11A.

As described above, according to various exemplary embodiments, different feedback messages may be provided according to voice recognition errors and voice task modes. Therefore, a user may accurately determine an error in voice recognition. Also, the user may obtain an effect of having a conversation with an electronic apparatus, and thus providing increased entertainment for the user.

A program code for performing a control method according to the above-described various exemplary embodiments may be stored on various types of recording media. In detail, the program code may be stored on various types of terminal-readable recording media such as a random access memory (RAM), a flash memory, a read only memory (ROM), an erasable programmable ROM (EPROM), an electronically erasable and programmable ROM (EEPROM), a register, a hard disk, a removable disk, a memory card, a universal serial bus (USB) memory, a CD-ROM, etc.

The foregoing exemplary embodiments are merely exemplary and are not to be construed as limiting. The present disclosure may be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method comprising:
if the voice start command is a user voice command received via the microphone of the electronic apparatus, executing a first voice input mode for receiving a first voice input via a microphone of an electronic apparatus; and
if the voice start command is a user input received via a preset button on the remote controller, executing a second voice input mode for receiving a second voice input via a microphone of a remote controller,
wherein the first voice input is a first set of voice items available for voice commands, and
where the second voice input is a second set of voice items available for voice commands.

2. The method of claim 1, further comprising:
displaying a first icon during the first voice input mode, on a display unit of the electronic apparatus to indicate that the voice input is to be received via the microphone of the electronic apparatus; and
displaying a second icon, different from the first icon, on the display unit during the second voice input mode, to indicate that the voice input is to be received via the microphone of the remote controller.

3. The method of claim 2, further comprising:
displaying a first set of voice items which guide a user with inputting voice commands during the first voice input mode; and
displaying a second set of voice items which guide the user with inputting voice commands during the second voice input mode,
wherein the first set of voice items include at least one voice item that is included in the second set of voice items, and the first set of voice items include at least one voice item that is not included in the second set of voice items.

4. The method of claim 3, wherein, during the first voice input mode, the first icon and the first set of voice items are displayed in a menu section over a broadcast image, and
during the second voice input mode, the second icon and the second set of voice items are displayed in the menu section over the broadcast image.

5. The method of claim 4, further comprising:
displaying one of a plurality of predefined feedback messages when a first voice recognition error occurs during any one of the voice input modes; and
displaying another one of the plurality of predefined feedback messages when a second voice recognition error occurs during any one of the voice input modes.

6. The method of claim 5, wherein the display feedback messages are randomly selected from the plurality of predefined feedback messages.

7. The system of claim 5, wherein the electronic apparatus comprises a television apparatus, and the voice input comprises a verbal instruction uttered by a user.

8. The method of claim 1, wherein the electronic apparatus comprises a television apparatus, and the voice input comprises a verbal instruction uttered by a user.

9. A system comprising:
an electronic apparatus having a display unit and a microphone; and
a remote controller including a microphone,
wherein the electronic apparatus is configured to execute a first voice input mode by receiving a voice input via the microphone of the electronic and a second voice input mode by receiving a voice input via the microphone of the remote controller,
wherein, if the voice start command is a user voice command received via the microphone of the electronic apparatus, the electronic apparatus is configured to execute the first voice input mode;

wherein, if the voice start command is a user input received via a preset button on the remote controller, the electronic apparatus is configured to execute the second voice input mode, wherein, in the first voice input mode, a first set of voice items are available for voice commands, and wherein, in the second voice input mode, a second set of voice items are available for voice command.

10. The system of claim 9, wherein the electronic apparatus is configured to display on the display unit a first icon during the first voice input mode, to indicate that the voice input is to be received via the microphone of the electronic apparatus, and a second icon, different from the first icon, during the second voice input mode, to indicate that the voice input is to be received via the microphone of the remote controller.

11. The system of claim 10, wherein the electronic apparatus is configured to display on the display unit a first set of voice items which guide a user with inputting voice commands during the first voice input mode; and the electronic apparatus is configured to display on the display unit a second set of voice items which guide the user with inputting voice commands during the second voice input mode, wherein the first set of voice items include at least one voice item that is included in the second set of voice items, and the first set of voice items include at least one voice item that is not included in the second set of voice items.

12. The system of claim 11, wherein, during the first voice input mode, the first icon and the first set of voice items are displayed in a menu section over a broadcast image, and during the second voice input mode, the second icon and the second set of voice items are displayed in the menu section over the broadcast image.

13. The system of claim 12, wherein the electronic apparatus is configured to display on the display unit one of a plurality of predefined feedback messages when a first voice recognition error occurs during any one of the voice input modes; and the electronic apparatus is configured to display on the display unit another one of the plurality of predefined feedback messages when a second voice recognition error occurs during any one of the voice input modes.

14. The system of claim 13, wherein the display feedback messages are randomly selected from the plurality of predefined feedback messages.

15. The system of claim 9, wherein the voice start command is received to manually select one of the first voice input mode and the second voice input mode.

* * * * *